(12) United States Patent
Campbell et al.

(10) Patent No.: US 7,602,944 B2
(45) Date of Patent: Oct. 13, 2009

(54) METHOD AND SYSTEM FOR COUNTING MOVING OBJECTS IN A DIGITAL VIDEO STREAM

(75) Inventors: John Roderick Campbell, Kanata (CA);
Wayne Lawrence Dustin, Ottawa (CA);
Christian Joseph Eric Montminy,
Ottawa (CA); Michael Peter Baynger,
Ottawa (CA); Alexander Scott Campbell, Ottawa (CA)

(73) Assignee: March Networks Corporation, Ottawa, Ontario ( * ) Notice: Subject to any disclaimer, the term of this patent is extended or adjusted under 35 U.S.C. 154(b) by 749 days.

(21) Appl. No.: 11/398,538

(22) Filed: Apr. 6, 2006

(65) Prior Publication Data

US 2006/0227862 A1    Oct. 12, 2006

Related U.S. Application Data

(60) Provisional application No. 60/668,596, filed on Apr. 6, 2005.

(51) Int. Cl.
*G06K 9/00* (2006.01)
*H04B 1/66* (2006.01)

(52) U.S. Cl. ...................... 382/103; 375/240

(58) Field of Classification Search ............. 382/103, 382/107, 236; 348/14.15, 25, 97, 129, 142–145, 348/154, 155, 169–172, 208.1, 208.2, 208.14; 375/240, 240.01, 240.16
See application file for complete search history.

(56) References Cited

U.S. PATENT DOCUMENTS 5,153,720 A * 10/1992 Kawai .................... 348/416.1
6,816,186 B2 * 11/2004 Luke et al. ................. 348/159

* cited by examiner

*Primary Examiner*—Abolfazl Tabatabai
(74) *Attorney, Agent, or Firm*—Curtis Behmann Borden Ladner Gervais LLP

(57) ABSTRACT

A method and system are provided for counting moving objects in a digital video stream. In contrast to known computationally-expensive methods, areas of motion are determined by threshold subtracting a current video frame from a short term average video scene. An object box surrounding an object is determined by threshold subtracting the current video frame from a long term average video scene. Coordinates of the moving object are identified by associating the area of motion with the object box, if it overlaps the area of motion, to define a moving object box. An event counter can be incremented when the moving object box is in a buffer zone in the current frame, and was in a detection zone in an earlier frame, and was initially detected in a buffer zone on the opposite side of the detection zone.

25 Claims, 10 Drawing Sheets

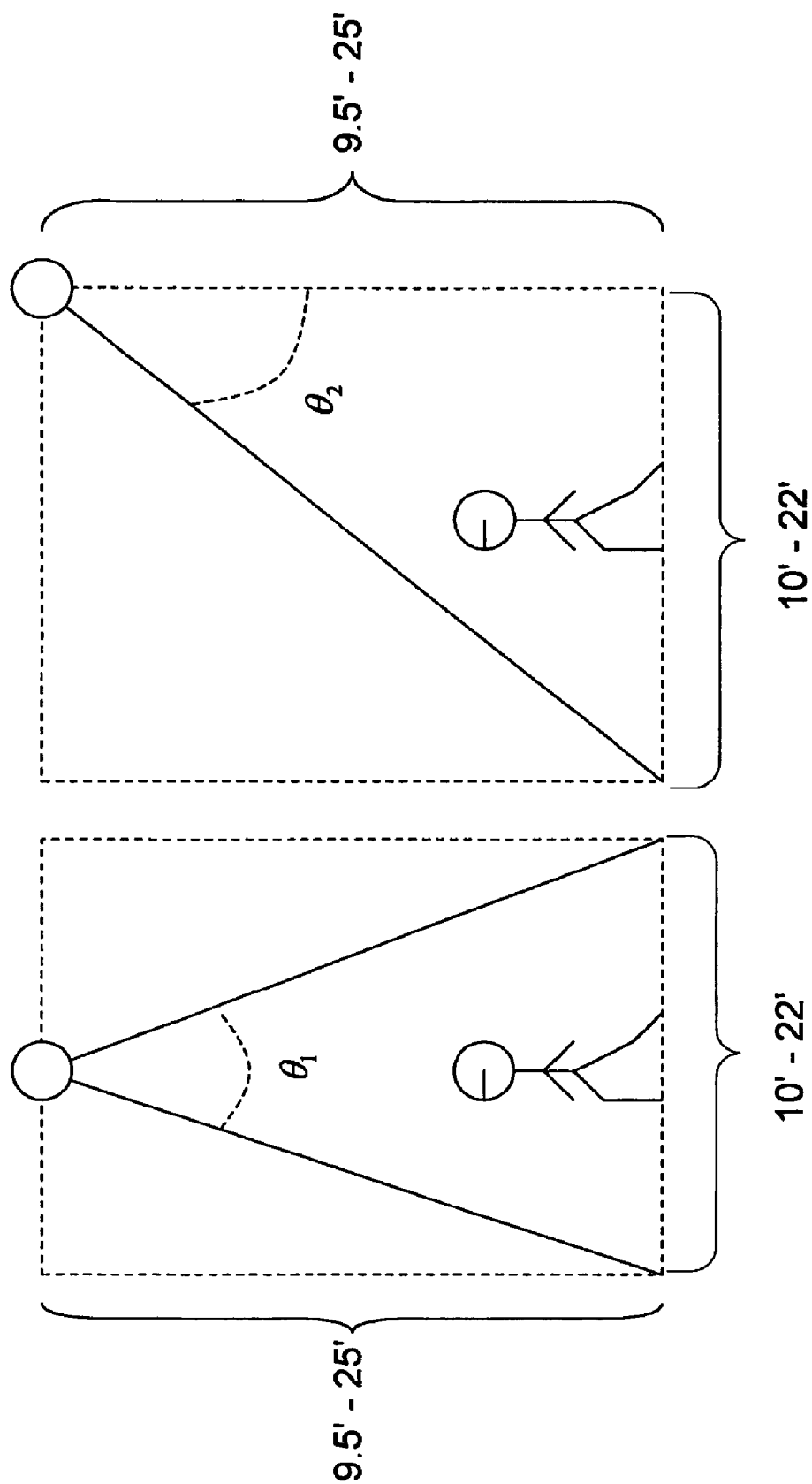

METHOD AND SYSTEM FOR COUNTING MOVING OBJECTS IN A DIGITAL VIDEO STREAM

CROSS REFERENCE TO RELATED APPLICATIONS

This application claims the benefit of U.S. Provisional Patent Application No. 60/668,596 filed Apr. 6, 2005, which is incorporated herein by reference in its entirety.

FIELD OF THE INVENTION

The present invention relates generally to systems and methods for tracking object motion. More particularly, the present invention relates to a system and method for tracking and counting moving objects.

BACKGROUND OF THE INVENTION

In many applications, it is desirable to have an indication of the presence of moving object. For example, traffic patterns at the entry/exit of a retail establishment can provide useful marketing data, and can assist in decision-making relating to staffing and security. A video camera can be used as a sensor that can detect moving objects. Some known approaches track a moving object based on historical data. One common approach uses Kalman (or similar predictive) filtering, which is often based on historical data relating to object movement. Other approaches use discrimination in order to determine whether an object is the same object from frame to frame. Sometimes, one or more parameters such as color or texture are used as a signature that is observed in one frame to have one value; all of the pixels of the next frame are then examined for the occurrence of that same value. Most of these approaches are computationally expensive.

While most known approaches operate on a full resolution video image from a video camera or similar recording means, it may be advantageous not to operate on the full resolution image in order to track or count a moving object. Operating on a lower resolution image can be less computationally expensive, and still provide for accurate counting or tracking of moving objects.

In previously-known systems and methods, tracking moving objects has been typically achieved by combining algorithms to solve several different problems independently. The main problems to solve are object detection, object tracking, and object classification. There are a wide variety of algorithms that exist to solve each of these problems. Most prior art systems and methods have been developed independent of image resolution, although the prevailing wisdom is that a higher resolution will give more data to work with, and thus a more accurate result.

Object detection is the process of locating objects in an image. Some object detection algorithms have been developed purely for video, and some have been developed for still frames, but can be applied to video. Many of these methods are based on image segmentation methods such as region growing, edge detection, texture analysis, etc. There are also learning methods such as neural networks and support vector machines that must trained with known input data. Video based methods typically use motion information (pixel changes between frames) to help identify moving objects. Video methods may use background modeling, or pixel modeling to identify when a pixel change is significant enough to be an object, and not just noise or shadows. Object tracking associates objects found in a previous frame with objects found in the current frame. Typical methods include path predication based on previous location and motion, and comparisons of object characteristics (signatures) such as colour, luminance, size, shape, etc. Object classification or discrimination can be done using neural networks, but these require training using a set of known data. Support vector machines are another solution, which also requires training data. Other classification methods include shape detection, size analysis, pose analysis, etc. For people detection, some methods have made use of face detection algorithms. As a result, the previously-known systems and methods for tracking objects have tended to be computationally expensive. This computational complexity increases as the image resolution and frame rate increase.

It is, therefore, desirable to provide a method and system for tracking or counting moving objects which is less computationally demanding.

SUMMARY OF THE INVENTION

It is an object of the present invention to obviate or mitigate at least one disadvantage of previous methods and systems for tracking and counting moving objects.

In a first aspect, the present invention provides a method of identifying a moving object in a digital video stream. An area of motion is determined by threshold subtracting a current video frame from a short term average video scene. An object box surrounding an object is determined by threshold subtracting the current video frame from a long term average video scene. Coordinates of the moving object are identified by associating the area of motion with the object box if it overlaps the area of motion.

The method can further include: defining a moving object box based on the coordinates of the moving object; comparing the moving object box of the current frame to moving object boxes of a previous frame with respect to a count zone, the count zone including a detection zone and a buffer zone; and incrementing an event counter when the moving object box is in the buffer zone in the current frame and was in the detection zone in an earlier frame. The previous frame can be an immediately preceding frame.

A current position of the object can be updated when the moving object box of the current frame overlaps in the detection zone with a moving object box of the previous frame. The object can be added to a database of tracked objects when the moving object box does not overlap in the count zone with any of the moving object boxes of the previous frame. In that case, the moving object box can overlap a buffer zone adjacent the detection zone. The event counter can be incremented based on a direction of travel of the object through the count zone. The event counter can be incremented when the object has moved out of the detection zone and into an exit buffer zone adjacent the detection zone, the exit buffer zone being on an opposite side of the detection zone from an entry buffer zone by which the object entered the count zone.

The step of threshold subtracting can be based on a luma component of the current video frame. In that case, the area of motion can be determined by threshold subtracting the luma component of the current frame from the short term average video scene. The area of motion can include a bitmap of changed motion areas of the current frame, and the short term average video scene can be determined by filtering previous video frames using a short term average filter. The object box can be determined by threshold subtracting the luma component of the current frame from the long term average video scene. The object box can include a bitmap of changed object areas of the current frame, and the long term average video scene is determined by filtering previous video frames using a long term average filter.

The method can include a box growing method including: generating a line segment based on a starting location and run-length of changed pixels of a current raster line of an object bitmap; including the line segment in a box under construction when the line segment is adjacent to the box under construction; and defining the box under construction as a moving object box when the box under construction intersects with a motion bitmap. A new box under construction can be created when the line segment is not adjacent to any boxes currently under construction. A box under construction can be defined as a completed box when the box under construction does not have an adjacent line segment.

A video image upon which the current video frame is based can be acquired at a frame rate determined in relation to known object movement parameters. The resolution of a video image can be reduced to produce the current video frame. Prior to the step of comparing, the moving object box can be discarded if it does not meet an object of interest threshold. Person discrimination steps can include: identifying edge pixels in the moving object box; and identifying the presence of an object of interest if the edge pixels exceed a minimum person size threshold. The minimum person size threshold can be previously determined by: estimating a minimum person size based on object location areas and edge pixel data from previous video frames; performing the person discrimination steps using the estimated minimum person size; and removing shadows based on a minimum number of edges per person.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 10A and 10B illustrate exemplary placements for a camera for use with an embodiment of the present invention.

DETAILED DESCRIPTION

Figure 1:
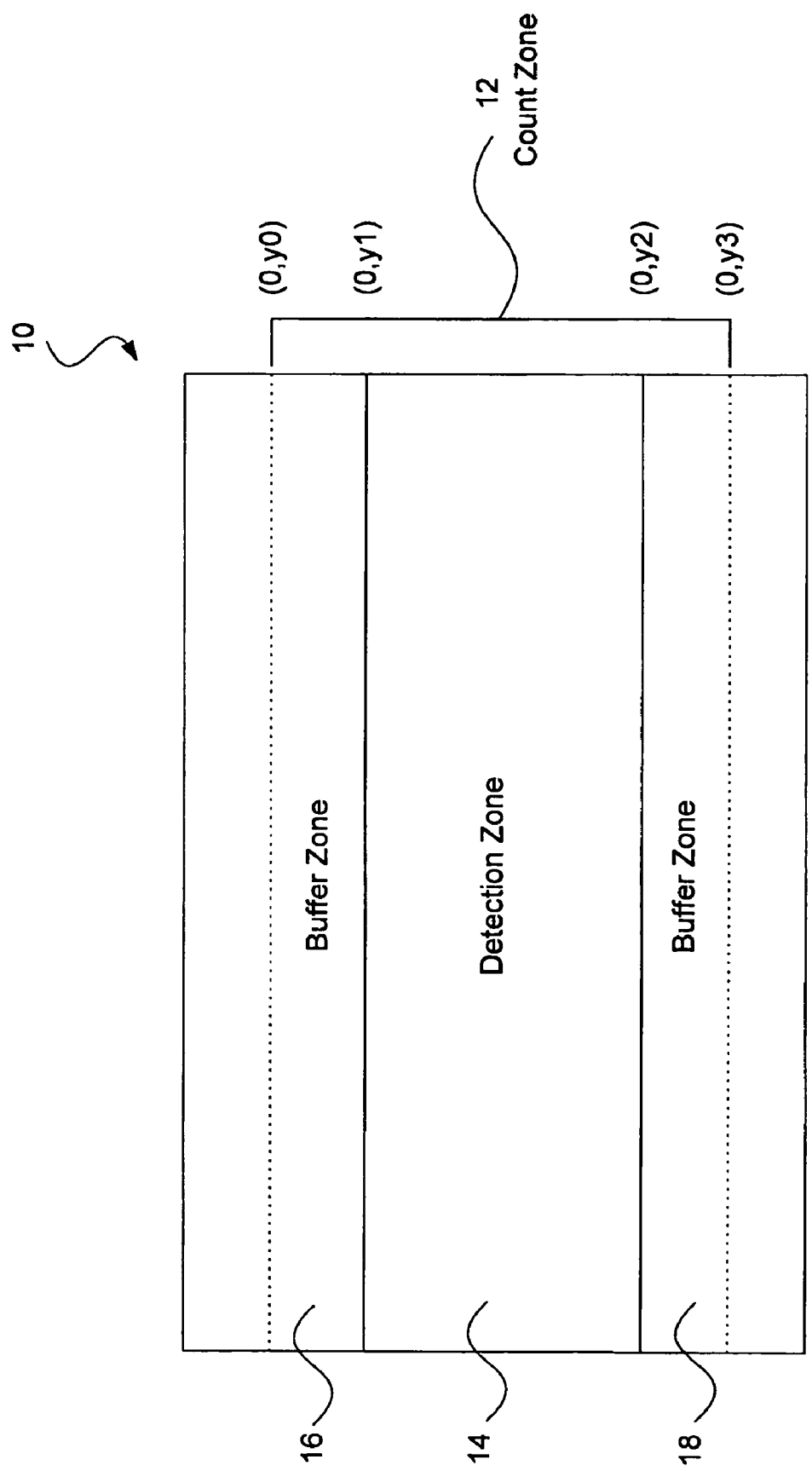
FIG. 1 illustrates a camera field of view and count zone sub-region according to an embodiment of the present invention.

Generally, the present invention provides a method and system for counting moving objects in a digital video stream. In contrast to known computationally-expensive methods, an area of motion is determined by threshold subtracting a current video frame from a short term average video scene. An object box surrounding an object is determined by threshold subtracting the current video frame from a long term average video scene. Coordinates of the moving object are identified by associating the area of motion with the object box if it overlaps the area of motion, to define a moving object box. An event counter can be incremented when the moving object box is in a buffer zone in the current frame and was in a detection zone in an earlier frame. The invention can be used for entry/exit tracking at a passageway in a retail establishment, or any other entry/exit location. Additional information based on two-dimensional direction of motion can be used to provide useful marketing data.

The present invention provides a low cost multi channel object tracking solution. This is achieved by a series of simplifications and lessened system requirements. Object detection is done using a combination of edge detection and pixel differencing. The method uses a low resolution image created by low pass filtering a higher resolution image (currently full resolution NTSC or PAL frame). The exact size of the low resolution image can be changed for a different application, at the cost of higher computation requirements. The high resolution image does not have to be a full resolution NTSC or PAL frame, it can be any high resolution image. Object detection has been simplified because noise is reduced by low pass filtering and fewer pixels are processed. Object tracking has been simplified by using an overhead camera to solve the occlusion problem, and ensuring object overlap from frame to frame by using video at a set rate (e.g. 15 frames per second). Object discrimination has been simplified by installing the overhead camera to give a predetermined range for the size of the field of view, thereby permitting the size of people to be known, and installing the system in known locations, where the only moving objects of this size are people.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. Embodiments of the invention described herein can be implemented as a software routine, hardware circuit, firmware, or a combination thereof. Embodiments of the invention can be represented as a software product stored on a machine-readable medium (also referred to as a computer-readable medium, a processor-readable medium, or a computer usable medium having a computer readable program code embodied therein). The machine-readable medium can be any type of magnetic, optical, or electrical storage medium including a diskette, compact disk read only memory (CD-ROM), memory device (volatile or non-volatile), or similar storage mechanism. The machine-readable medium can include various sets of instructions, code sequences, configuration information, or other data which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium can interface with circuitry to perform the described tasks.

Embodiments of the present invention preferably deal with the counting of entry and exit events at a passageway or entrance way, such as at the doors of a large retail establishment. Advantageously, the solution can be scaled to other entry/exit applications with parametric adjustment of algorithms to match the optics and geometry of the problem space. (e.g. public transit entry/exit). In these applications, a camera can be employed as a light sensor in a configuration that suits the counting purpose. Counting an entry/exit event can alternatively be referred to as incrementing a tracking counter. Identifying a moving object can alternatively be referred to as counting the object, which is different from counting an entry/exit event.

FIG. 1 illustrates a camera field of view 10 and count zone sub-region 12. The count zone 12 can be dynamically adjusted based on detection of known physical elements in the field-of-view or on known measurements, such as the height above the door or wall, and/or separation between radio frequency (RF) theft-prevention security gates. Many retail establishments have RF detection gates at entrances and exits in order to prevent theft. The RF detection range of these gates is typically about 3 to about 4 feet. Therefore, such gates are typically spaced about 6 feet away from each other. If the sensor camera is placed such that RF detection gates are in the field of view, the method can then make a parametric determination based on the relationship of pixels and the known distance between RF detection gates. The detection of the location of the RF gates can be performed in a software routine. Similar automatic determinations can be made based on other known physical parameters, such as width or a height of a standard doorframe.

The count zone 12 can be defined by the co-ordinates (0,y0) and (0,y3). The entire count zone 12 can be input to a moving object detector as the region of interest for detecting and tracking moving objects. The count zone 12 preferably comprises a central detection zone 14 and bounding buffer zones, such as first and second buffer zones 16 and 18. The detection zone 14 is used by a tracker (shown as 108 in FIG. 3) to begin a new object track and maintain the track on objects in a tracking database. The buffer zone is used to signal the completion of a tracked object, once it has exited the detection zone, which results in counting an entry/exit event. The height of the detection zone 14 can be determined based on the number of samples required to statistically identify the object being tracked. The minimum buffer zone height can be determined by a typical person size and sampling rate. A minimum of 1 sample in the buffer zone is necessary to complete a track.

In order to determine direction, the system can remember the coordinates of the object in a first frame. As the object moves within the field of view, the object will cross a certain point within the field of view, at which point the method can determine that the object has moved into a buffer zone and has traversed a detection zone. The distance defining the length of the count zone is preferably chosen such that it is bigger than the size of the object to be tracked. A moving object can trigger a count as an entry/exit event when it is determined that the same object has moved from one buffer zone through the detection zone into the other buffer zone, within the acceptable object speed range.

Figure 2:
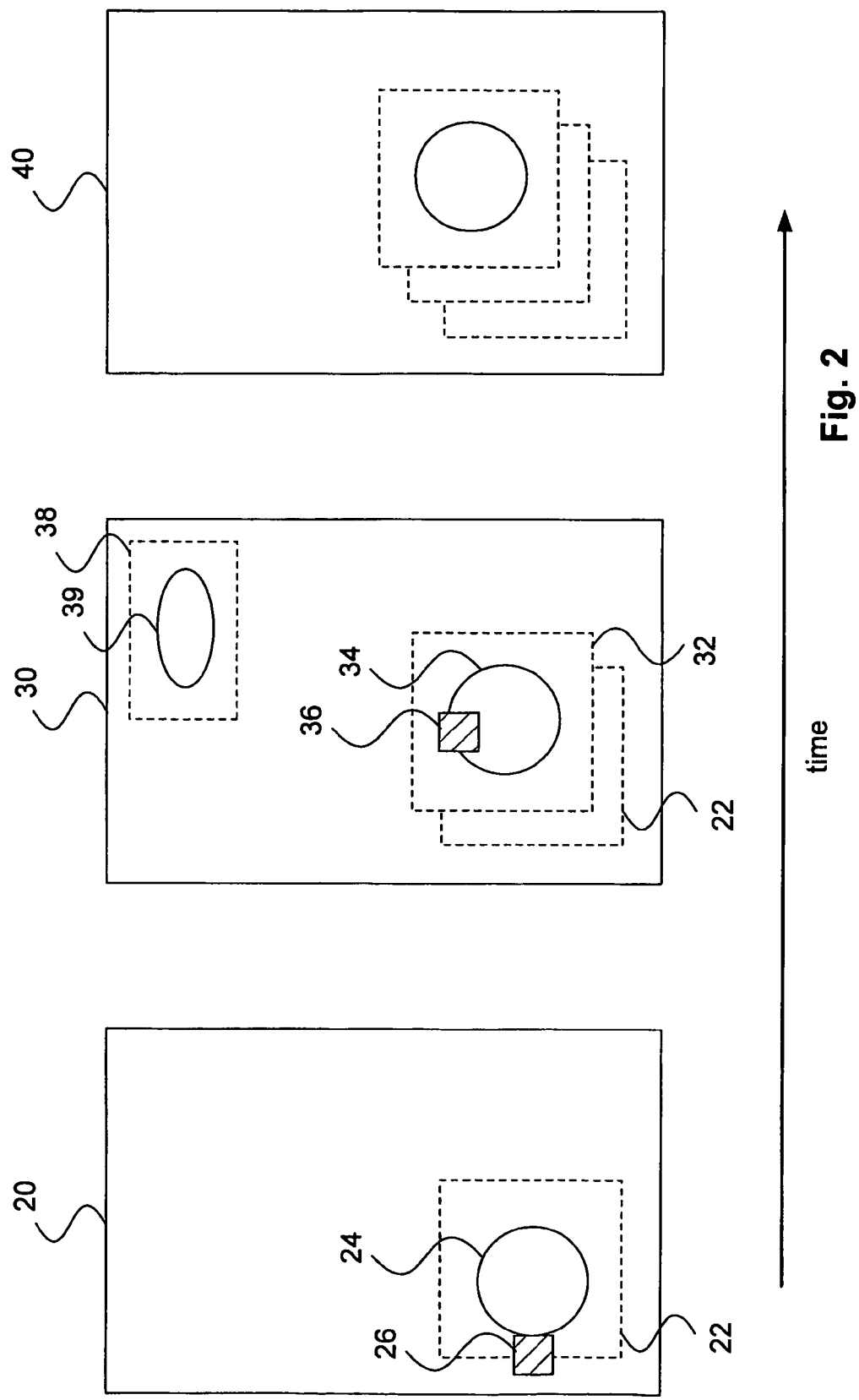
FIG. 2 illustrates sample successive image frames that can be produced and analyzed by a system according to an embodiment of the present invention.

FIG. 2 illustrates sample successive image frames that can be produced and analyzed by a system according to an embodiment of the present invention. In the first frame 20, a first object box 22 is found, which defines the coordinates of a first object 24. Details on how the object box is defined will be presented later. If an area of motion 26 overlaps the first object box 24, the object box is now tagged as a moving object box, and its coordinates are stored. When observing the next image frame 30, the system does not attempt to predict where that first object will now be located. Instead, a second object box 32 is found, which defines the coordinates of a second object 34, which is determined in the second frame 30. If an area of motion 36 overlaps the second object box 32, the object box is now tagged as a moving object box, and its coordinates are stored.

The tracker 108 identifies and tracks a moving object by tracking from frame to frame whether a second object box 32 overlaps the first object box 22. If such an overlap exists, the tracker determines, in response to detection of the overlap, that the object 24 in the first object box is the same as the object 34 in the second object box. In the second frame 30, there is a new object that appears. The system detects a third object box 38 defining coordinates of a third object 39. Since this third object box 38 does not overlap an object box from the previous frame, it is determined that this is an appearance of a new object. In the third frame 40, there is no object box that overlaps the third object box 38. Consequently, it can be determined that the detection in the third object location area was simply an error or an aberration.

Figure 3:
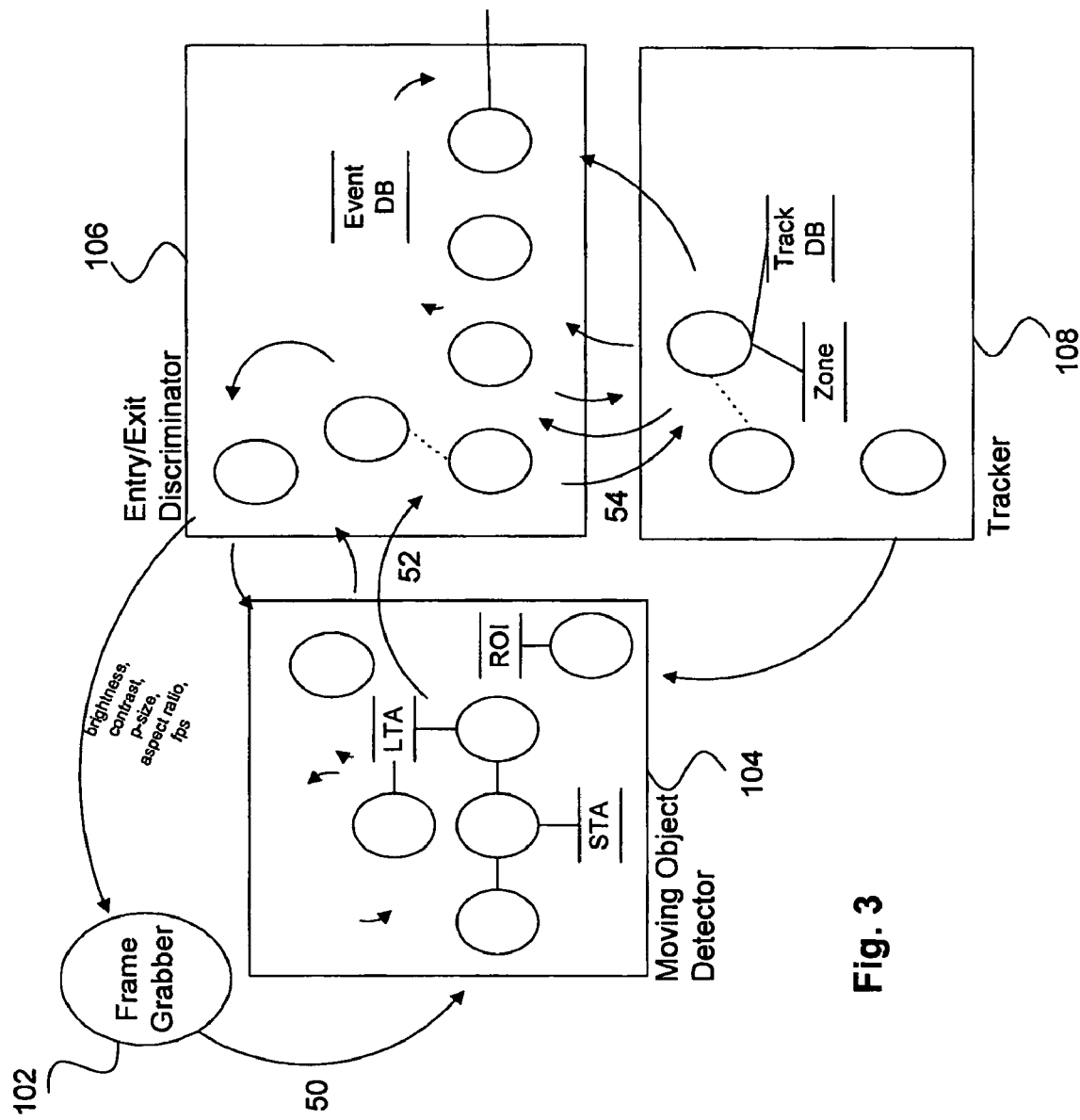
FIG. 3 is a block and data flow diagram of an embodiment of the present invention.

FIG. 3 is a block and data flow diagram of an embodiment of the present invention. A method according to an embodiment of the present invention can be implemented in software stored on a computer readable medium having statements and instructions which, when executed, cause a processor to perform certain steps in the method. A method or system according to an embodiment of the present invention preferably includes the following elements or modules: a moving object detector, a discriminator, such as an entry/exit discriminator; and a tracker. A light sensor such as a camera (not shown) is provided. A light intensity component, such as intensity of light pixels, of the camera signal can function as the light sensor. An exemplary light intensity component is a luma component. Luma is the weighted sum of the RGB components of a color video signal, proportional to intensity. Luma can also be defined as the Y component of the Y, Cb, Cr colour space. Alternative light sensor implementations can be used.

Camera picture capture rate and resolution settings are preferably automatically controlled by the system of an embodiment of the present invention, rather than by operator intervention. A two-dimensional count zone, such as described in relation to FIG. 1, is defined as a sub-region of the camera field-of-view (FOV) for tracking and discrimination purposes. A sample rate for video image capture is chosen such that a box from a video frame will overlap in space with its corresponding box from a previous video frame. The term "previous video frame" as used herein refers to a video frame that precedes a current video frame, and preferably immediately precedes the current video frame. (As used herein an "earlier video frame" is a frame that precedes, and preferably immediately precedes, the previous frame.) The maximum sample rate is defined by the camera or light sensor, and can be automatically controlled by down sampling the maximum sample rate.

A process flow according to an embodiment of the present invention will now be described, though alternative process flows can be implemented. Video frames captured from a frame grabber 102 are forwarded in step 50 to an object detector 104, such as a moving object detector (MOD) for first inspection. The frame grabber 102 can be part of, or in communication with, a camera or light sensor. The MOD 104 preferably executes background modeling and temporal change detection algorithms, to produce a map of foreground objects within the count zone. Initially, this component gathers a sufficient number of frame samples to build the background pixel raster, during which time (in the transient state) its output is gated. The MOD can preferably record and retrieve last known background reference frames from persistent computer memory, such as non-volatile memory devices and magnetic media, to reduce the time required for this transient state. If a background reference frame does not exist, the MOD proceeds to build one from the input samples.

Once steady state is reached, the MOD then examines a current video frame for the appearance of moving objects. A set of coordinates can be defined which surround the object and define an object box. The area or box can be defined by the coordinates of two points which define diagonally opposite corners of a rectangle. If an area of motion overlaps the object box, the object box is defined as a moving object box. In step 52, the MOD outputs a list of box coordinates to a discriminator, or entry/exit discriminator, 106 for each video frame, representing the moving objects. The discriminator 106 preferably pre-filters this list of boxes by removing object boxes smaller than a minimum specified size, taking into account the types of object the system is interested in detecting. Once the object boxes have been defined, it can be desirable to detect the direction of motion of the object, e.g. whether a person is entering or exiting a retail establishment. In alternative embodiments, other degrees of freedom can be added in order to gather marketing data, such as determining statistically the direction of flow of traffic within a store in order to better design store layouts.

In step 54, the list of moving object boxes is passed to the tracker 108. The tracker 108 maintains a state database of items being tracked across the count zone. It executes the primary part of the algorithm's accuracy requirement. Where a new box cannot be matched with a database box, a new object is created for tracking. Where a database object has no overlapping object in a video frame, the tracked object is removed. The tracker maintains logic to deal with boundary conditions of one to many and many to one overlap. The tracker registers each object box overlapping condition by incrementing a hit-accumulator for the object. The tracker 108 passes all positive tracks, i.e. each object box in the count zone, to the discriminator 106 for final event decision regarding a positive match. The discriminator registers a hit by incrementing a positive match-accumulator for the object.

In order to register a positive entry/exit event count in a presently preferred embodiment, the object is first detected on one side of the detection zone, and traverses to the opposite side of the detection zone. The buffer zones are preferably used to determine where tracks are started and where tracks are terminated. The discriminator generates events based on original and final positions and on the statistics of the hit-accumulator and positive match-accumulator.

Figure 4:
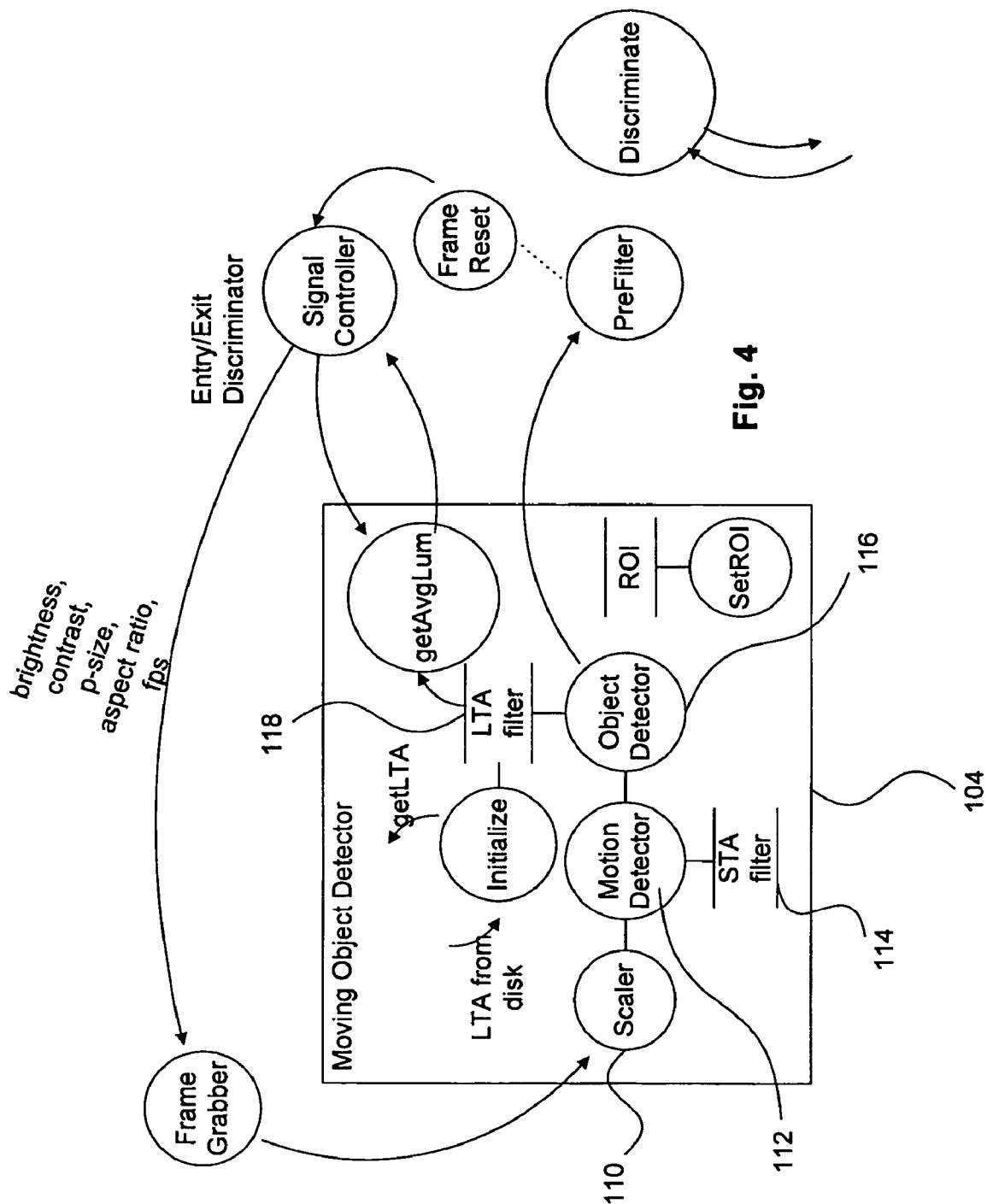
FIG. 4 is a block and data flow diagram showing the moving object detector of FIG. 3.

FIG. 4 illustrates a block and data flow diagram of the moving object detector module 104 of FIG. 3. The moving object detector is preferably designed such that resolution is parametric and can be refined to adjust/configure according to requirements of the application, such as defined by the entry/exit discriminator. Resolution requirements for applications according to embodiments of the present invention are much less than resolutions provided by video cameras. As such, the computational and storage demands of this method are significantly reduced by statistically weighting and filtering the pixel data to produce lower resolution reference images.

It is worth noting that the moving object detector 104 is different from a motion detector. A technique, according to embodiments of the present invention, allows the user to first find out what is moving and then determine the geometric area of the moving object so that a similar geometric area can be observed in the long-term response. This permits an identification of the cause of the motion of the object. Therefore, what is being found is not just the changes, but the foreground object that is causing the changes. In other words, the method can first find the occurrence of the motion and then can determine the object causing the motion. Suppose a man has entered a room and stopped in front of a wall while moving his hands. A motion detector would detect the fact that his hands are moving. A moving object detector, according to the embodiment of the present invention, detects the man's hands and the man's body as being the object that is causing the motion. This is part of the segmentation process and the determination of what is a foreground object. Therefore, the method does not simply trigger on moving things but rather on what is causing motion.

Whereas some known approaches use a single frame of reference, with respect to which detection of motion is to be performed, embodiments of the present invention preferably use a plurality of frames of reference (e.g. 2 frames of reference) to make such a determination. The use of a plurality of frames of reference allows a more accurate segmentation of foreground objects from background objects, or foreground parts of a picture from the background. These frames of reference are preferably constructed with the use of DSP filtering methods.

The types of filters used are independent of the number of filters employed. In one embodiment of the present invention, the filters can both be implemented as linear filters. In a presently preferred embodiment, one of the filters is implemented as a non-linear adaptive filter, while the other filter is implemented as a linear filter. When two linear filters are employed, the two filters would have different time constants or averaging periods. The moving object detector 104 preferably uses two average frames, a short term average (STA) and a long term average (LTA). The LTA represents the background model, and the STA is used to find motion. In a particular embodiment, the LTA is a nonlinear filter with a 4 second time constant. The LTA filter response should be short enough such that the background reaches steady state within typical inter-person spacing, yet long enough to tolerate a momentary pause of a moving object. In a particular embodiment, the STA is a linear filter with a 1 second time constant. The STA filter response should be long enough to suppress random lighting noise, yet short enough to detect the slowest anticipated motion.

In the moving object detector 104, a plurality of filters can be employed. Two infinite impulse response (IIR) filters can be used to provide recursive real time performance at a low monetary cost. When two such filters are employed, the first filter preferably has a low frequency response whereas the second filter has a higher frequency response as compared to the first filter response. In other words, the method sums the field-of-view pixels over time, which can be considered to be averaging. The filter with a low frequency response can be used to track background elements or objects. The filter with the higher frequency response is for finding motion in the scene, i.e. what is moving in the short term.

Threshold differences of the current frame with the STA and LTA produce moving areas and foreground objects, respectively. The threshold value is a design parameter which is adjustable. Neighbourhood combining is preferably applied to only the LTA difference matrices via a box-growing algorithm. The moving object detector according to an embodiment of the present invention is preferably optimized to remove box overlap, by combining box unions into one larger box.

Various components or modules are shown in FIG. 4 and will now be described in relation to the discussion above. At initialization, the MOD can preferably record and retrieve last known background rasters from persistent computer memory, such as non-volatile memory devices and magnetic media, to reduce the time required for this transient state. If a background raster does not exist, the MOD proceeds to build one from the input samples. When required to be accumulated via live capture (e.g. the case when a reference image is not readily available), motion conditional logic is applied in the course of building the initial LTA image. In a preferred embodiment, the LTA is declared usable only after all picture elements have met the time constant averaging requirement.

A scaler 110, or scaler function, contributes to maintaining the application's required resolution, while (1) reducing the downstream CPU load, by reducing the number of samples exposed to further processing, (2) reducing the storage requirement for reference frames and (3) reducing random noise in the image by weighted averaging or low pass filtering. Although the scaler 110 is shown in FIG. 4 as being part of the moving object detector 104, the scaler can be independent of the moving object detector, as long as it is in communication with the moving object detector and an original video image is scaled prior to being provided to the moving object detector. A exemplary resolution required for this application is a minimum 1 foot inter-person spacing. For 10 pixels per foot in height, these can be reduced by 4:1. Each raw frame received from the frame grabber can be down-sampled by ¼, generating a single element for each 4×4 pixel block. This can be done by a simple average of each 4×4 block rather than by more computationally expensive means, such as linear filtering.

A motion detector function 112 preferably applies a temporal nonlinear IIR filter to the sequence of video frames, maintaining the Short Term Average (STA) state of the scene. Each new frame is threshold compared with the STA, generating a bitmap of changed areas of the frame. The motion detector 112 can include a short term average filter 114. An object detector 116 is similar to motion detection. A long term average filter 118, such as a temporal nonlinear IIR filter, is applied to a sequence of video frames to produce a Long Term Average (LTA) state of the scene. The time constant (step response) of the LTA filter 118 is necessarily greater than that of the STA filter 114. Essentially, the object detector 116 subtracts the current frame from the LTA, applies a threshold comparison and generates a bitmap of changed areas. A list of box coordinates that correspond to these areas is produced with the box-growing algorithm.

The IIR filter employed as the LTA filter 118 in an embodiment of the present invention is nonlinear, updating only those areas of the LTA that have not changed according to the output of the motion detector 112. The motion bitmap generated by the motion detector is used for the purpose of conditional LTA update. Boxes are preferably constructed from the object detector bitmap with the box-growing algorithm. The intersection of a box with one or more bits from the motion detector bitmap defines a moving object within that box. Moving objects are preferably represented in the form of a list of box coordinates.

A preferred embodiment of a box-growing algorithm will now be described. The box-growing algorithm generates box coordinates in real-time on a raster-scan-order, line by line basis. The first step computes the starting location and run-length of changed pixels of the current raster line of the object bitmap. These are represented as line segments. The second step compares these line segments to state variables that represent boxes in process of construction. Line segments that are adjacent to boxes under construction are included as part of the box, hence the term box-growing. Line segments that are not adjacent to any boxes under construction are used to create a new box under construction. Any box under construction that does not have an adjacent line segment becomes a completed box. The third step compares boxes under construction with the bitmap of the motion detector. If an intersection of the box and moving pixels exists, the box is considered moving. After all raster scan lines are processed as described by these steps, the box coordinates representing objects in motion are determined.

Figure 5:
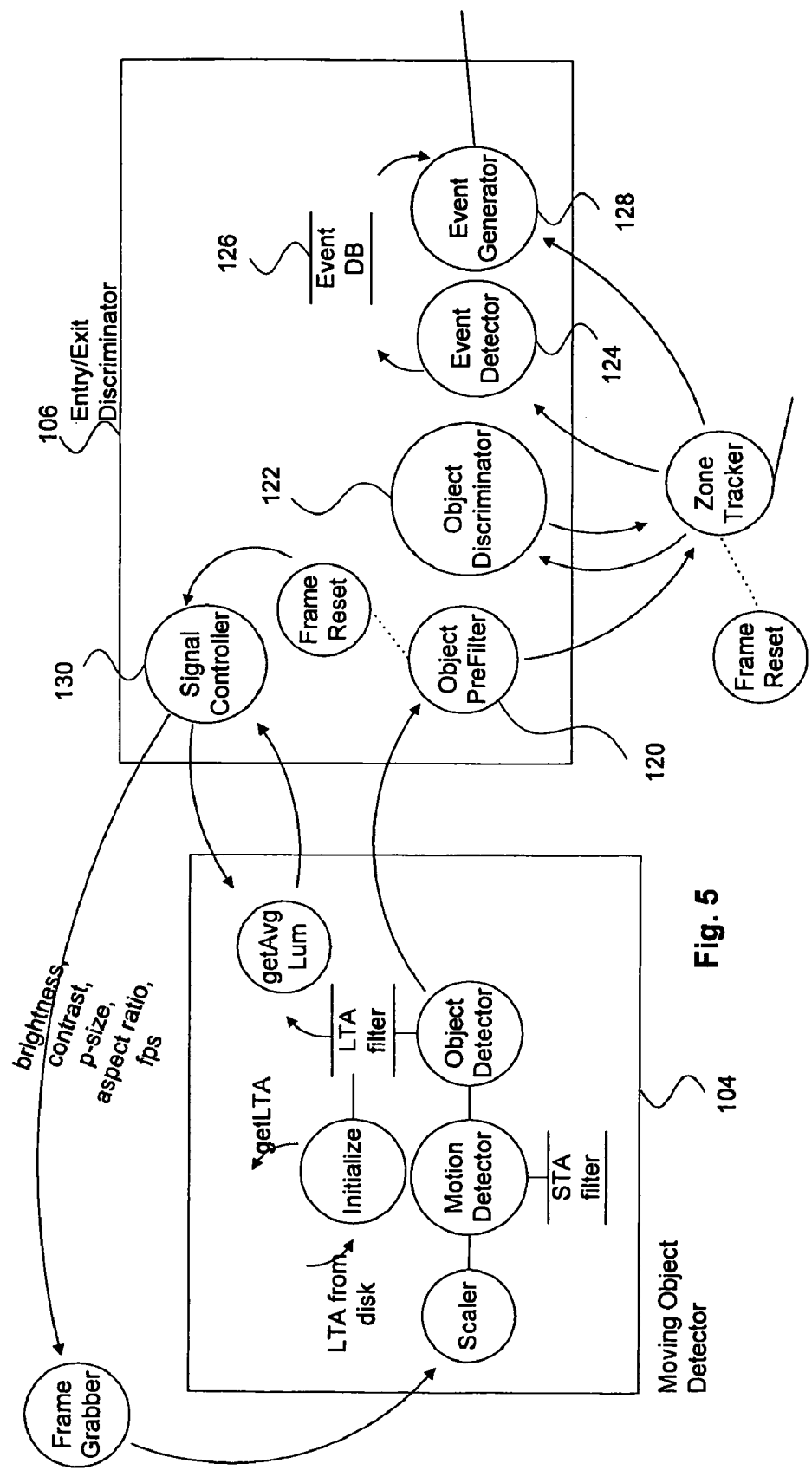
FIG. 5 is a block and data flow diagram showing the entry/exit discriminator of FIG. 3.

FIG. 5 is a block and data flow diagram showing the discriminator, such as an entry/exit discriminator, of FIG. 3. The discriminator 106 is for discriminating one object from another object, or for discriminating one type of object from another type of object. For example, the discriminator can distinguish between a person and a shopping cart. Initialization requirements for the discriminator module can include the establishment of communication paths with the tracker. In the simplest form, these are the callback or callout functions required by the tracker for the functions Object Discriminator, Event Detector and Event Generator. A frame reset function performs and initiates reset conditions for this module at every video frame boundary. Clearing of the Event Database can be included in this logic.

An object pre-filter function 120 receives the list of moving objects for every video frame, from the moving object detector 104. Its purpose is the removal of any objects which need not be tracked in subsequent processing. In this application, this involves the removal of objects which do not meet a minimum size specification to be of interest. The minimum size specification can be based on the type of object to be tracked, or which is of interest. The pre-filtered list is then passed to the tracker module. An object discriminator 122 can be implemented as a service module, invoked by the tracker for every object being tracked. Logic here determines the probability of whether the tracked object is an object of interest. An object attribute is incremented if this is the case.

An event detector 124 is a function that can be implemented as a service module, invoked by the tracker for every object being released from the tracking database. In other words, these objects are no longer being tracked. It is the purpose of the event detector 124 to make the final determination of the tracked object, based on the original tracking position, final tracking position, number of detections represented by the hit-accumulator and number of positive matches registered by the Object Discriminator function for each object classification attribute. When an object traverses the count zone from bottom to top, an entry event will be generated. When an object traverses the count zone from top to bottom, an exit event will be generated. The event, if one is determined to have had occurred, is recorded in an event database 126. An event generator 128, when invoked by the tracker, completes processing for each video frame. The event generator 128 converts the events from the event database 126 into statistical information, which is communicated or registered with the application.

A signal controller 130 provides video decoder/driver control settings for the camera. Preferred embodiments can include dynamic control of brightness and contrast settings. Average ambient lighting brightness can be maintained at the 50% level by computing the spatial average of the MOD's LTA reference frame, and adjusting brightness accordingly. This provides a means for this invention to adapt to changing ambient lighting conditions. There can be an issue of whether sufficient contrast in the FOV exists to meet accuracy requirements. This can be partially mitigated by the ability to control these settings. A sample (frame) rate can be chosen such that consecutive boxes of the same person will overlap, given person size and walking speed. For example, an average person walks at about 4 ft/sec. A brisk walk is about 8 ft/s and about 12 ft/s is a full out run. A preferred embodiment of the present invention is designed to detect motion of speeds from about 1 to about 8 ft/s. At the maximum speed of about 8 ft/s, the minimum person dimension of about 1 foot is covered in about ⅛ second. The sample rate must be greater than this, and can be set to about 15 fps as sufficient margin for this design.

The approach according to embodiments of the present invention is similar in nature to consideration of the Nyquist theorem. The Nyquist theorem relates to the reproduction of a digitized signal and states that in order to reproduce a digitized signal, a certain sampling or digitizing rate must have been used in the digitization. By analogy, if it is possible to know in advance the typical speed of the objects that are being tracked, a particular picture sampling rate can be used. For the example of tracking the movement of people across a threshold of an entrance/exit of a retail establishment, the speed of movement of people in that area can be very predictable. Therefore, a method or system can advantageously be given a predictable object speed range, which is preferably controlled by the signal controller 130.

With respect to the movement of people, the predictable speed is typically in the range of about ½ foot per second to about 8 feet per second. In particular embodiments, any object speed below the lower limit of the predictable object speed range or above the upper limit of the predictable object speed range will be determined not to be of interest, and ignored. Any motion slower than the lower limit will typically be blended into the background and any motion faster than the upper limit will produce moving object boxes that do not overlap in consecutive frames. The sampling rate of the camera, or frame rate, is typically chosen such that the physical size of the object (e.g. a person) has a relationship with the geometry of the camera. A person, when viewed from the top, would typically fit within an object location area of about 1 foot X about 3 feet. Because those dimensions are known, it is possible to select a frame rate for the camera, or a sampling rate, such that the object or person cannot move far enough within one picture such that the bounding box in one frame does overlap the bounding box in the next or the previous frame. In other words, a sampling rate in the camera is chosen to be high enough so that the bounding box of an object in one frame will overlap the bounding box of the object in the next frame. This permits a determination that it is the same object in that same overlapping area without having to examine the entire image.

According to embodiments of the present invention, the frame rate is adjustable to accommodate the motion physics of the application. The overlapping of the moving object location areas are such that the boxes surrounding the moving object will overlap from one frame to the next, and thereby enable tracking of the object. Because of that overlap, it is not necessary to detect signatures or perform other computationally expensive functions. There is also no need to perform prediction according to this approach.

Figure 6:
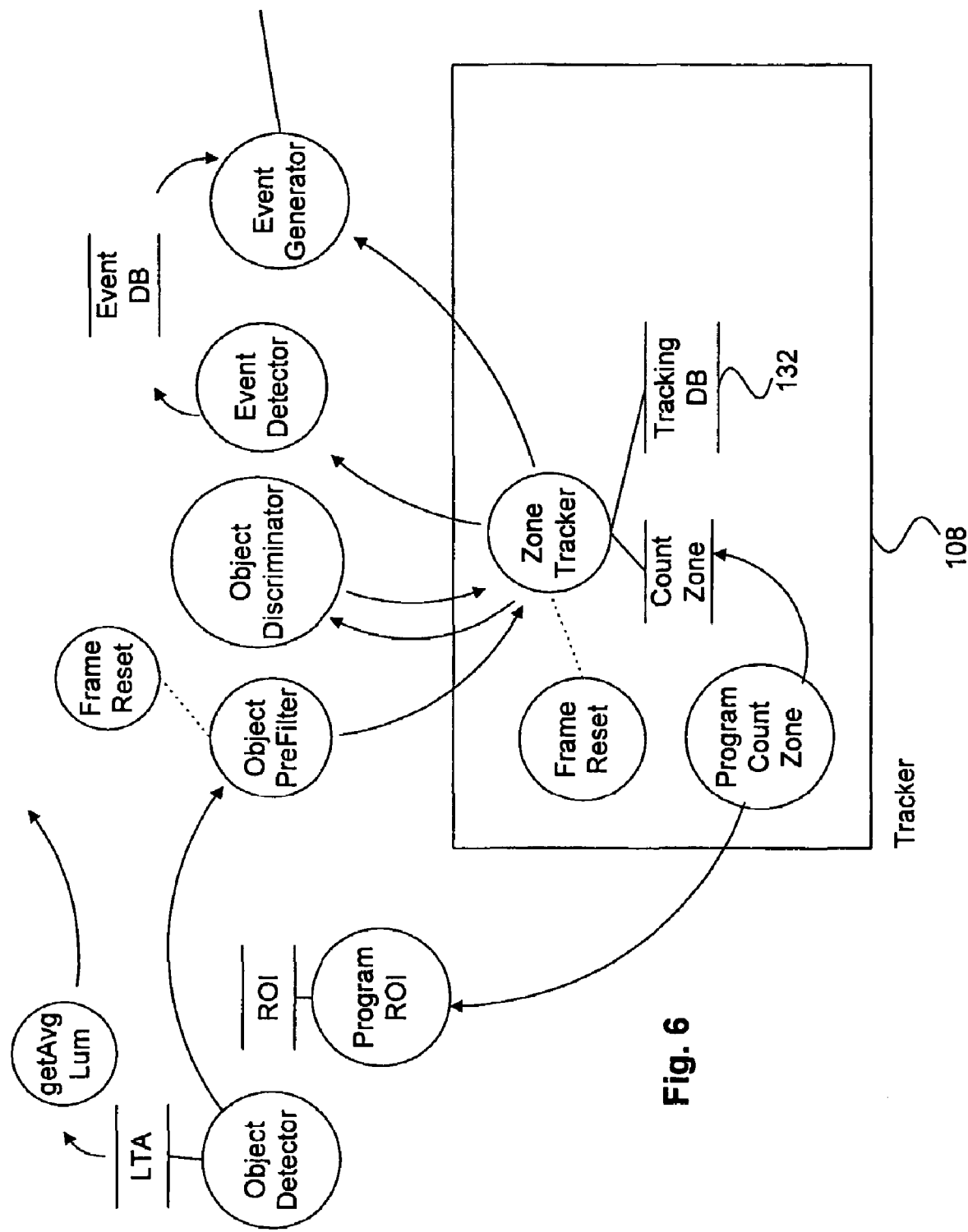
FIG. 6 is a block and data flow diagram showing a tracker of FIG. 3.

FIG. 6 is a block and data flow diagram showing the tracker of FIG. 3. The tracker 108 is responsible for tracking moving objects through the count zone, as described earlier. The tracker maintains a database, or tracking database, 132 of objects currently being tracked. When the tracker receives a list of objects from the discriminator, the logic will address the following cases: one to one corresponding overlap; one to many corresponding overlap; and many to one corresponding overlap. In the case of multiple overlaps between objects in the current frame and existing tracks, the tracker determines which track to assign the moving object box by minimizing the distance between box centres. This is the distance between the centre of the box defining the current object, and the centre of the box defining the last tracked box in the track database.

The following logic is preferably executed for each object in the list: 1) The corresponding object (overlapping box) from the tracking database is located; the location coordinates are updated, and the number of detections incremented; 2) Any objects not present in the database are created with original location coordinates, and number of detections set to 1; and 3) Objects in the database, for which there is no matching input box, are removed from the database. After the input list is processed, the tracking database 132 is scanned for objects outside the detection zone, which have transitioned the detection zone. For each of these, the discriminator is called to register the event, and the object is removed from the tracking database. Each entry in the tracking database 132 preferably has the following attributes: original (x,y) coordinates; current (x,y) coordinates; hit-accumulator and positive match-accumulators, or counts, for each object classification of interest. The tracker can include positional statistics on count zone entry and exit points.

For every object detected by the system, two counters are preferably kept. In an embodiment, both counters begin at "0". The first counter is an object overlap counter (or hit-accumulator) and tracks the number of occurrences of overlapping boxes, or object location areas. The second counter, or positive match counter (or accumulator), counts the number of times that the discriminator indicates a positive match that the object being detected is an object of interest, such as a person. An unexpected movement of a person in an image such as if a person bends down to tie his shoe, could result in the discriminator not sending a signal to increment the positive match counter. At the end of a particular number of frames, if an object has moved from the first buffer zone through the detection zone and into the second buffer zone, the two counters will be consulted in order to make a final determination as to what event has occurred. The determination is typically made based on the ratio of the counts of the two counters.

Therefore, if it is expected that there will be 32 pictures in a particular time period of interest, the tracker will likely count to 32 and the discriminator will count a number that is less than or equal to 32. If the count of the second counter exceeds a positive match threshold, it is determined that the object was in fact an object of interest, such as a person. Therefore, after the object has moved through the count zone, there is a statistical determination with respect to the event that occurred. As will be discussed in further detail below, it can be preferable to use a fixed camera installation in which various camera configuration or installation parameters are known. If such a fixed camera setup is not used, it may be necessary to determine ahead of time parameters such as the size (in terms of number of pixels) of the buffer zones and the count zones, the predicted goals, object motion speed, etc. Many of those relationships are parametric. The system needs to know within the field of view of the camera how the pixel distances relate to the object of interest, and preferably to real distances. The use of the fixed height camera configuration predetermines all of those variables and simplifies system set-up.

Figure 7:
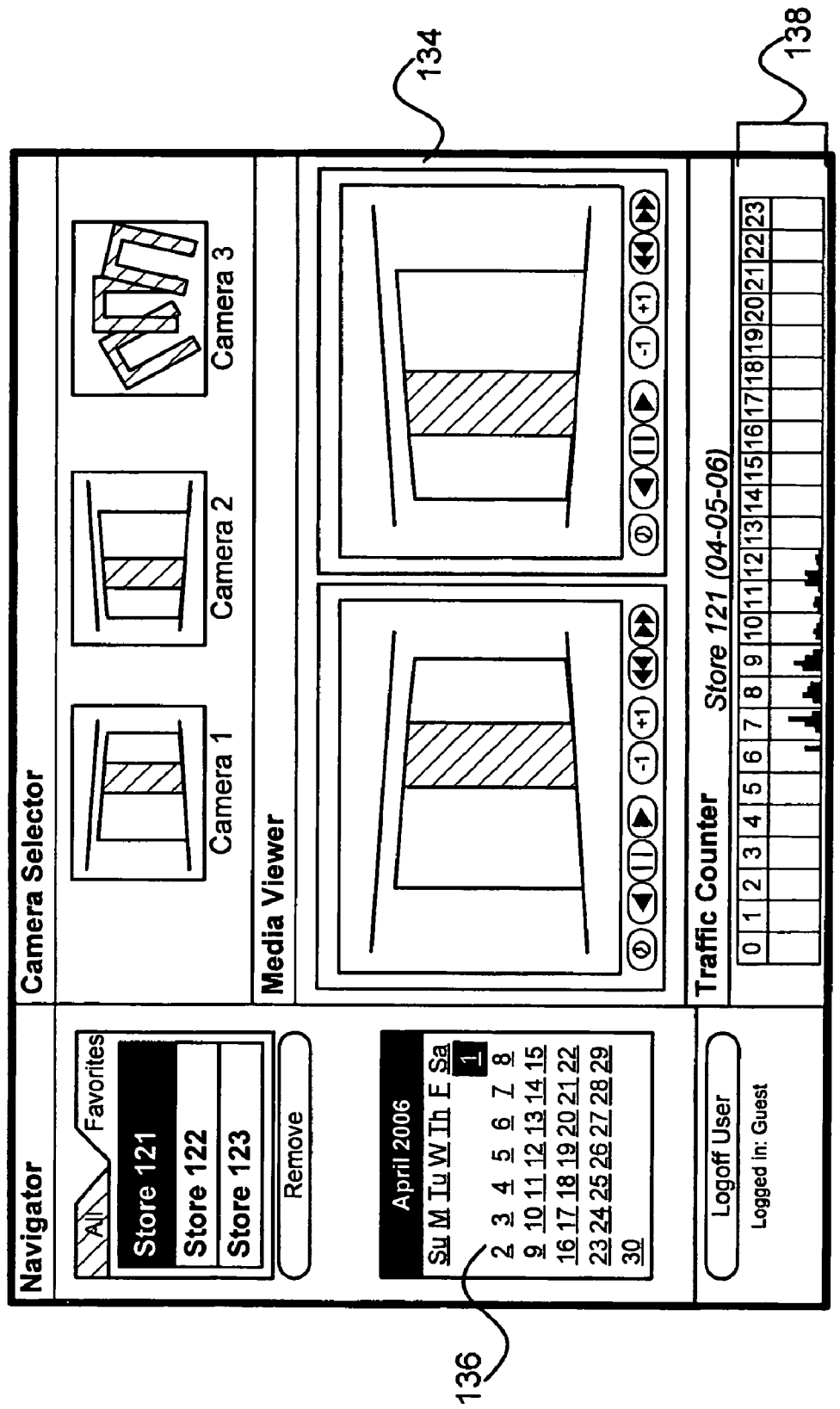
FIG. 7 illustrates a graphical user interface for use with an embodiment of the present invention.

FIG. 7 illustrates an example screen shot of the user interface of moving object counting software, or traffic monitoring software, according to an embodiment of the present invention. Embodiments of the present invention also preferably include a graphical user interface for the software, according to an embodiment of the present invention. The user interface can include a video viewing area 134, which can provide access to a video feed from a camera that captures the view in a count zone, such as at an elevator entrance or at the front of a store. A calendar area 136 is preferably provided by means of which a user can select a particular day and access a video footage from that day. A graph area 138, shown in FIG. 7 at the bottom of the display area, can provide a graphical display over time, such as a 24 hour time period, of the number of people in a store.

It can be desirable to use a fixed predetermined location of the sensor camera. This fixed, known configuration can provide a relationship between pixel elements and distance so that distances can easily be determined simply by measuring a number of pixels in an image. This fixed geometry can reduce software processing but may otherwise be required in order to perform such calculations. A particular resolution per foot can be related to the geometry of the scene. In a preferred embodiment, a specific camera setup can ensure a known field of view (FOV), uniform across all camera installations. This setup simplifies the operation of the algorithms, providing a known fixed geometry and pointing angle. This removes a requirement for software configuration.

Figure 8:
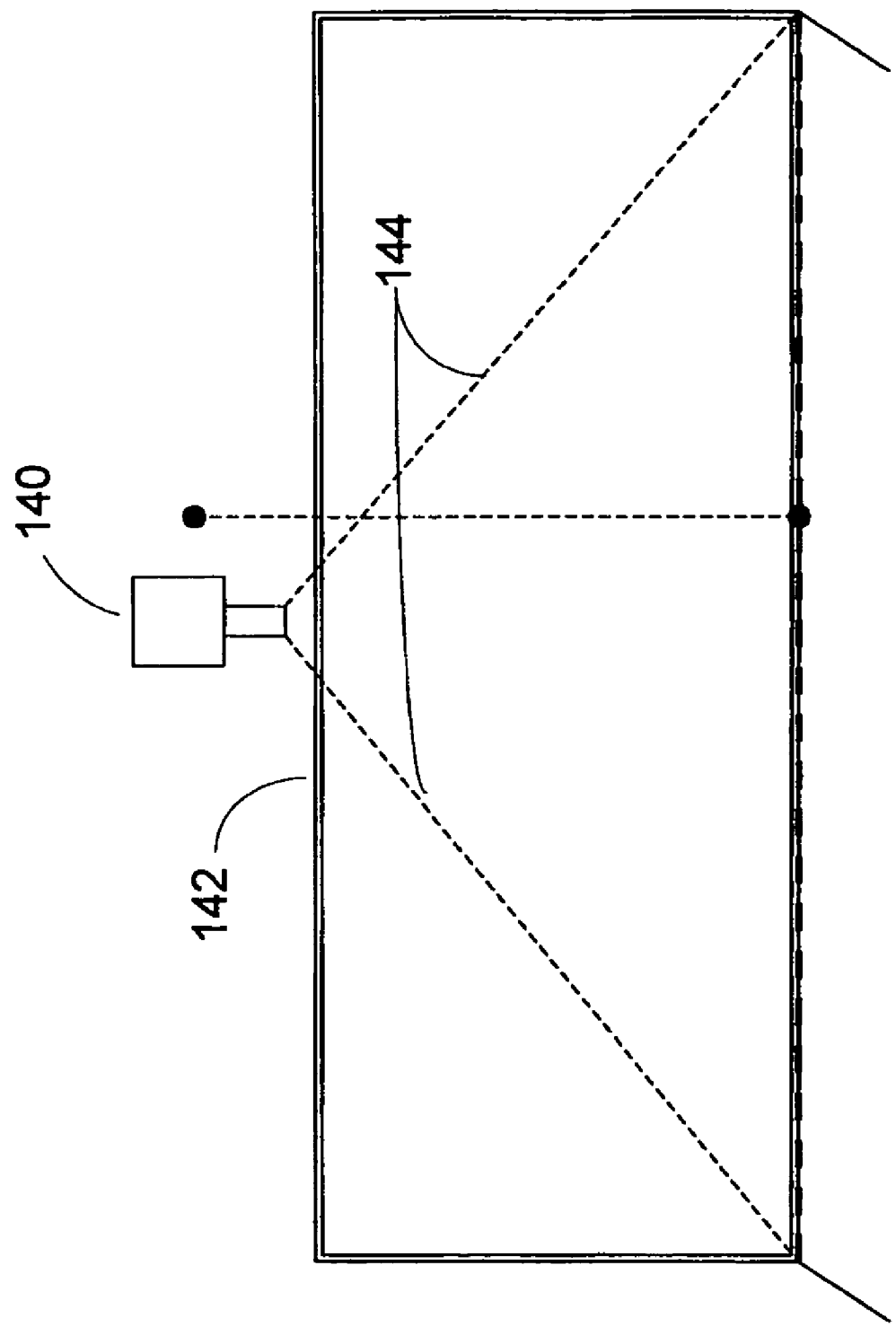
FIG. 8 illustrates an exemplary fixed camera sensor-positioning configuration used in accordance with an embodiment of the present invention.

FIG. 8 illustrates an exemplary fixed camera sensor-positioning configuration used in accordance with an embodiment of the present invention. Although the video from a camera can be viewed (for test purposes), it is not intended for general viewing. For example, it may be sufficient to sense the intensity of the light pixels and to determine, based on contrast, the differences—what is in the foreground and what is in the background of a particular video image captured. The camera can assist in determining and identifying an object moving in the foreground versus a background, such as a floor or a wall. In some instances, the background will typically be a floor.

In the embodiment shown in FIG. 8, the sensor camera 140, which can include a CCD imager, is placed above a doorframe 142 with the lens pointing towards the floor, preferably at about a 90-degree angle to the floor. The sensor camera is mounted at a height (H), which is preferably higher than the height of the doorframe 142 such that the camera lens includes (in its field of view 144) the area on top of the doorframe itself. It is important to note that other non-sensor cameras can be provided for viewing information such as whether employees are performing required duties at the store entrance. The additional non-sensor cameras are typically provided at an oblique angle in order to show the entrance to the store itself. However, such additional cameras are not typically used to perform counting of moving objects according to the embodiments of the present invention.

In addition to preferably providing a fixed height for the positioning of the camera, other factors that can be determined based on known parameters include: the type and size of the imager used in the camera; and the type and size of lens to be used in the camera in order to provide the desired resolution and field of view. The sensor camera is preferably mounted at a particular distance from the wall itself. An exemplary installation/configuration arrangement will now be described in further detail, though alternative arrangements can be implemented.

First, the camera is mounted 90 degrees overhead, solving the occlusion problem. Second, a single camera is used. In terms of coverage of entry/exit doors of a large retail outlet, these doors can be assumed to be of standard building material, less than 8 feet in width for each double door. The camera specifications according to an embodiment of the present invention provide approximately 32 feet of coverage to accommodate up to 4 sets of double doors. The objective is to avoid FOV stitching, a problem otherwise introduced by using multiple cameras and overlapping FOVs. Third, the pointing angle positions the bottom of the FOV nearest to, and parallel with, the door plane. The direction of movement and entry versus exit events are hence known. The NTSC aspect ratio is 4/3, providing a FOV height of 24 feet. An average walker traverses this distance in 6 seconds, providing up to 180 pictures (NTSC of 30 frames per second) for temporal analysis.

The 32×24 foot FOV can be accomplished with a 1/3" CCD imager and a 2.5 mm focal length lens mounted at a height of 18 feet. A lower mounting height can be accomplished by one or more of the following to maintain a fixed horizontal and vertical resolution: width coverage required is less than 32 feet; lens of focal length less than 2.5 mm; and/or CCD image of 1/2", 2/3" or 1" as required. Expected error in these calculations can be about 5%, accommodating the camera manufacturer's specific CCD active imaging dimensions and lens quality.

Fourth, the camera can be mounted on the same side of the entrance as the RF theft-prevention security gates. The RF gates can serve as beacons to the method to automatically determine the count zone. The camera will be mounted a predetermined distance from the plane of the doors. This distance from the door plane ensures the FOV includes the area just inside the threshold, where entry and exit behaviour is most predictable (minimal loitering). Additionally, this mount ensures the wall above the doors is in the FOV, providing additional capability of automatically determining the count zone. Fifth, the camera lens can be manual iris, and adjusted optimally during installation. Software algorithms can then provide control of lighting as suited to the counting application. This camera configuration provides a known pixel resolution for the algorithms, of 22.5 pixels per foot width (720/32); and with a single NTSC field at 4/3 aspect ratio, 10 pixels per foot (240/(32*3/4)) height. The algorithms preferably operate on luma content only; both a black and white and colour camera can be used in this application.

Figure 9:
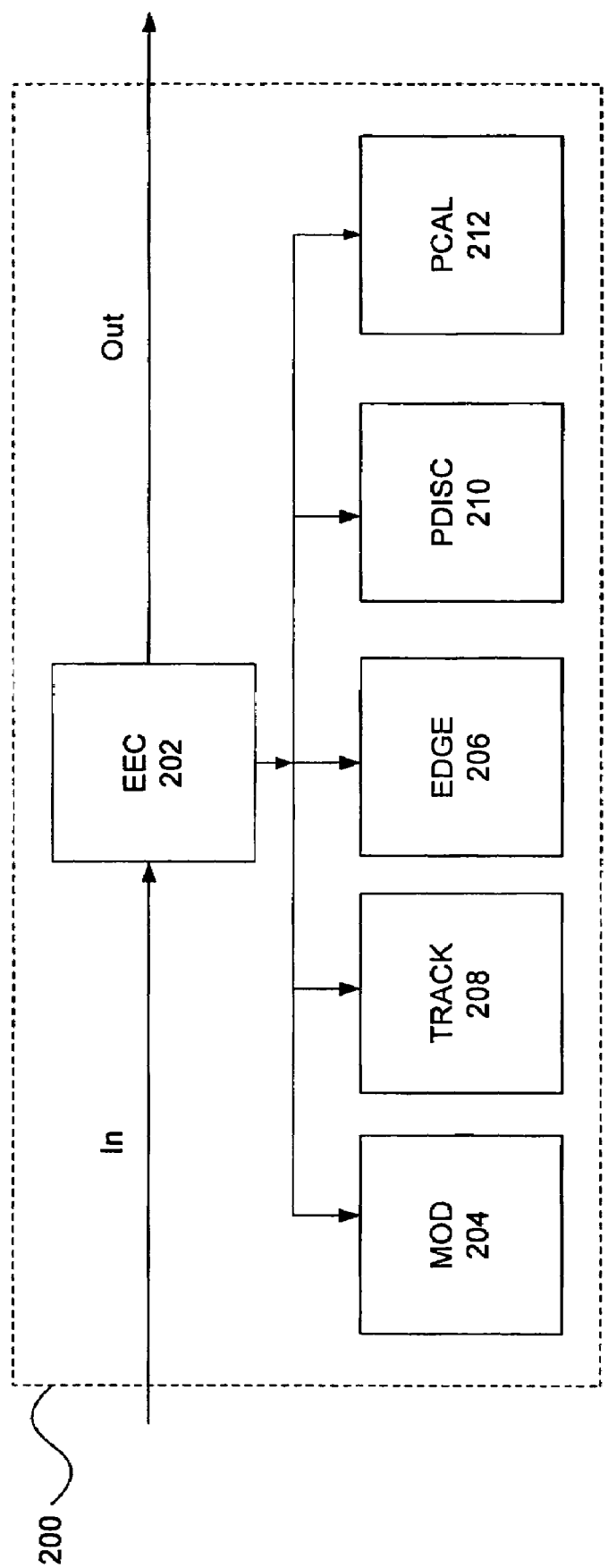
FIG. 9 is a block and data flow diagram of a people counting module, according to an embodiment of the present invention.

FIG. 9 is a block and data flow diagram of another embodiment of the present invention. In this embodiment, further features are provided in order to count people rather than just moving objects. In FIG. 9, a people counting system 200 includes an Entry Exit Counter (EEC) 202 and a moving object detector (MOD) 204. The function of the discriminator in the previously described embodiment is now represented by an edge module (EDGE) 206 and a people discrimination module (PDISC) 210. The edge module 206 finds the edge pixels in the MOD boxes, and the PDISC module 210 then uses the edge content to find people, using the specified people sizes, and sends the generated boxes to a tracker 208 to do all the tracking and event generation. The People Calibration (PCAL) module 212 runs at initialization to automatically calculate the size of people in the scene. Each of these elements will now be described in further detail.

The EEC 202 is the high level logic of the system that calls the sub-system components in the correct order with the correct parameters. At its input, the EEC 202 receives video frames from a video source, already scaled to the appropriate size for EEC processing. The EEC 202 sets the video frame size of the video source on initialization. At its output, the EEC 202 outputs the event counts, and may optionally output video data. The EEC 202 can also receive parameters associated with people counting. Such commands include FOV parameters, (if the FOV dimensions are specified in a command, all size related parameters can be calculated in terms of pixels), Count Zone parameters, etc.

The EEC 202 can include a method or protocol for sending event information. In a presently preferred embodiment, entry exit counts are tagged to the compressed video data. Preferably, each application has a configurable set of events of interest. Event 0 can be different for different applications. For example, in an embodiment, for the EEC, event 0 represents entries, and event 1 represents exits. For a traffic management module, such as aisle abandonment, event 0 can represent people entering from the left or right and exiting to the top. The EEC can optionally output video data. The EEC 202 preferably invokes the other components. It is specific to the particular application. The EEC is responsible for properly initializing these components. Such initializations or invocations can include, for example: start PCAL to calculate the people sizes, when finished it will have found both the minimum and maximum people sizes for this installation; start MOD, which will provide the list of moving object boxes and the on pixel map, when it has completed; start EDGE with the on pixel map, to provide an edge pixel map when it has completed; use PDISC to filter the box list so that any boxes that are too small to be people are removed from the box list; use PDISC to create a box for each person from the boxes in the box list; call TRK with the list of people boxes to track each box, and increment an event count as required when a track has completed; and tag the video frame with the event counts and output the video frame with the EEC data.

The MOD 204 is responsible for creating a list of boxes that describe objects in the frame, and tags them as moving or not moving. The MOD 204 in FIG. 9 is identical to the MOD 104 in FIG. 1.

The Edge Detector, or EDGE module, 206 finds the edge pixels in the MOD boxes. The EDGE module uses the scaled image to create an edge pixel map. It simply compares adjacent pixels, and ff the difference is greater than a threshold it is determined that an edge exists. Both vertical and horizontal edges are calculated. MOD finds objects using 'on pixels' and a box growing algorithm, EDGE finds the edge pixels in the boxes. PDISC then uses the edge pixels in the boxes to enhance the box coordinates, and uses the people sizes and a box growing like algorithm to find people sized boxes.

The PDISC module 210 uses the edge content of the MOD boxes to find people, using the specified people sizes. A box of minimum people sizes is preferably used to find the area along the side of the box with the most edges; the box grows using the edge pixels up to the maximum people size. A box must contain a minimum number of edges to be counted as a person. The boxes generated by PDISC 210 are then sent to the tracker, or TRK, 208. In an embodiment, the PDISC module includes the following functionality. A pre-filter deletes boxes that are too small to be people. An event generator compares the number of hits in a track to the required number of hits, to determine if an event has occurred. A people discriminator uses a list of boxes and the edge map to create an output list of people boxes.

The PDISC people discriminator functionality can be described by the following method steps: Reduce the box size so that each side of the box has at least 1 edge pixel. Find the best box starting point by finding the location of the minimum people size box that contains the most edges. Grow the box by extending the edges up to the maximum people size. If this grown box contains at least a minimum number of edges, it is a person. Delete the edge pixels just used and try to find the next person until there are no more edge pixels remaining.

The tracker, or TRK, 208, is very similar to the tracker 108 in FIG. 3. It receives boxes generated by PDISC 210. TRK 208 does all of the tracking, and the event generation. In this embodiment, all boxes that are passed to TRK are already discriminated to be people. TRK generates an event based on the direction it traveled through the count zone, and it must have generated a minimum number of 'hits' in the hit accumulator. A match accumulator is not used in this embodiment.

The method of the present invention can include an automatic people calibration, PCAL 212 in FIG. 9, to be implemented with people counting, such that the algorithm can reliably count people on any camera that satisfies basic functional or specification requirements. This embodiment calibrates the size of people that traverse the Count Zone. This automatic people size calibration feature simplifies the camera installation procedure by allowing the camera height to be within a certain range, instead of an exact height In this embodiment, the system begins in a calibration state, alternatively referred to as a calibration mode. In this state the system tracks objects without doing any people counting. The system keeps statistics of the minimum and maximum x and y sizes of the tracked objects. (An object is considered tracked if it traverses the Count Zone, i.e. it is an entry or an exit event). Once enough events have occurred, the system calculates the size of people from the acquired statistics. The calibrated people size data is then provided to the PDISC module. The system then achieves a calibration complete status, and changes modes from the calibration mode to an operational mode, in which it starts counting people (entry and exit events). A benefit of automatic calibration is that the camera installation procedure does not need to specify a fixed camera height and lens, for a given lens the camera can be mounted within a range of heights, so long as the field of view size falls within the specified range.

FIGS. 10A and 10B illustrate exemplary placements for a camera for use with an embodiment of the present invention. The people size calibration method, or algorithm, is designed for cameras mounted as given in FIGS. 10A and 10B. The system has been designed for cameras to be installed such that the height of the field of view is between 10 feet and 22 feet. This corresponds to a field of view width (entranceway coverage) of 13 feet to 29 feet. There are numerous combinations of camera mounting height and standard lenses that will meet this requirement. For example a ⅓" CCD camera with a 3.6 mm lens mounted at 15 feet will have a field of view height of 15 feet. Or a ⅓" CCD camera with a 6.0 mm lens mounted at 20 feet will have a field of view height of 20 feet.

A people counting algorithm, PCAL 212 in FIG. 9, according to an embodiment of the present invention operates in one of three states. The first state is a calibration state without PDISC. In this state (default starting state), a system operating according to the method of the present invention attains an initial estimate of a minimum X-size and Y-size by collecting box size data. These boxes have come from the moving object detector and have been processed by edge detection (some shadow removal). The TRK module keeps histograms of the minimum X-size and Y-size for the smallest box size for each entry and exit event. The first state is finished after reaching a State-1 threshold for the minimum number of events required to fill the histograms, such as 50 events (e.g. 20 people entering and 30 exiting).

The second state is a calibration state with PDISC. In this state, the people discriminator is now applied prior to collecting box size data. The State-1 minimum person size is used to operate the people discriminator (the maximum size of a person is assumed to be the scaled image size). In the second state, the TRK module keeps histograms of the both the minimum and maximum X-size and Y-size for the smallest and largest box size for each entry and exit event. The calibration of the second state performs better shadow removal than the first state because the people discriminator is given a minimum number of edges that a small person should produce. The second state is finished after reaching a State-2 threshold for the minimum number of events required to fill the histograms, such as 100 events in the Y-direction. The second state produces the minimum and maximum people size values for both the X-direction and Y-direction.

The third state is a people counting state. In this state, we know all that is necessary to track people using the current people counting method. It is expected that people with carts are counted only once, and groups of people are divided into the appropriate number of boxes. In a presently preferred embodiment, 50 first state events and 100 second state events are sufficient for calibration, though other event thresholds can be used for calibration.

With respect to determining the minimum people X-size value, the X-size that produced the most hits in the minimum people X-size histogram is found. This peak is assumed to represent the smallest X-size produced by most people walking, probably when each person's arms were close to their body. It is beneficial to use a slightly smaller X-size, in order to track children and small people. This requires a heuristic reduction, in this embodiment this is accomplished by multiplying the found X-size by 0.625. With respect to determining the minimum people Y-size value, the approach described with respect to minimum people X-size is used, but instead using the minimum people X-size histogram.

To determine the value of maximum people X-size, the X-size that produced the most hits in the maximum people X-size histogram is found. This peak is assumed to represent the largest X-size produced by most people walking. It has been empirically found that this approach finds the correct value. Intuition would suggest that we would have had to find a slightly larger X-size than what the peak gives, but this is not necessary. With respect to the value of maximum people Y-size, the approach described with respect to maximum people X-size is used, but the maximum people Y-size histogram. It is expected that if more than 50% of the traffic contains people pushing shopping carts, the histogram peak will come from shopping cart events. As a result, a further function can be provided to deal with such cases by detecting that there are, in fact, two large peaks and that the person produces that the peak that has the smaller Y-size. The maximum people Y-size is then heuristically adjusted by multiplying the found value by 1.3125 to get the size including a cart.

Embodiments of the present invention can advantageously be used in a Digital Signage Application. In this application, a business has digital signs (or some other advertising display), and the business is interested in tracking statistics relating to people who stop in the display area. The business would like information on the effectiveness of the advertising. They may be interested in the number of people who stop in the display area, how long they stop, and the number of people who stop in the display area. In order to support such a feature, in another embodiment, the moving object detector can include a non-moving object detector module. In such a case, the object detector can track non-moving objects as well as moving objects. The object detector would output 2 lists of boxes, one of moving objects, one of non-moving objects. TRK would use both box lists for tracking, but would only start new tracks using moving boxes. TRK would tell MOD which non-moving objects were being tracked, so that MOD would not update the pixels in the LTA for these boxes.

Embodiments of the present invention can also advantageously be used in an Aisle Abandonment Application, or other Traffic Pattern Analysis applications. In such an application, a business would like to know the path taken by customers, e.g. how many people enter the aisle, and how many didn't. In order to support this feature, another embodiment can extend operation to people moving in multiple directions, not just vertically (y direction) through the field of view. In one exemplary implementation, the count zone includes both y-direction buffer zones and x-direction buffer zones surrounding the detection zone. In this case, the TRK module has a function to calculate the direction of motion while tracking, preferably by comparing the location of the object box in the current frame to the location of the object box in the previous frame. The PDISC module would find people based on their orientation in the field of view (this is because people are symmetric in size or shape).

Embodiments of the present invention can be used in a mobile environment, such as for tracking the number of people entering and exiting a bus at particular bus stops. This can advantageously be employed in conjunction with GPS data that provides an indication of the location of the bus. In a mobile/transit counting implementation, one or more of the following advantageous features can be provided: entry/exit counts sum traffic patterns on a "per stop"/location; time stamped counts and GPS data for route and schedule planning; data upload when vehicle returns to depot (hotspots); and/or real-time alerts to a central location when the number of passengers approaches and/or exceeds vehicle capacity.

Embodiments of the present invention can be provided for integrated point-of-sale (POS) and traffic monitoring for remote terminal (RT) POS management. One or more of the following advantageous features can be provided: with directional sensing and people counting at entry/exit doors; POS data collected: number stations active, transactions per minute, etc.; RT alerts on number of people in store above or below the current POS staffing level; alerts transmitted over wireless to floor manager's handheld equipment; directional sensing and traffic counting at entry/exit doors; RT alerts on congestion; RT alerts when observed traffic count exceeds or falls below an expected traffic count; directional sensing and shopping cart counting at entry/exit doors; RT alert when people traffic high and shopping cart count low; directional sensing at the POS, measuring average time in queue, queue abandonment, queue length; and RT alerts on abnormal counts as compared with POS data.

In another application, an embodiment of the present invention can be used in the context of a booth or an exhibit, such as a trade show. The moving object detector/counter can be used in order to track traffic in a particular booth, around a booth or to determine how long people stand at different area within the booth. Embodiments of the present invention can also be used in relation to traffic monitoring for marketing data. In such cases, one or more of the following advantageous features can be provided: directional sensing and traffic counting at entry/exit doors; statistical measurement of entry traffic (left, right, ahead); and number of people in store over typical business cycle (day, week, etc).

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A computer-implemented method of identifying a moving object in a digital video stream, which, when executed on a processor, causes the processor to perform steps comprising:

determining an area of motion by threshold subtracting a current video frame from a short term average video scene;

determining an object box surrounding an object by threshold subtracting the current video frame from a long term average video scene;

determining object box coordinates on each line of the video frame by:

generating a line segment based on a starting location and run-length of changed pixels of a current raster line of an object bitmap;

including the line segment in a box under construction when the line segment is adjacent to the box under construction; and defining the box under construction as a moving object box when the box under construction intersects with a motion bitmap; and storing the object box coordinates as coordinates of the moving object if the object box overlaps the area of motion.

2. The method of claim 1 further comprising:

defining a moving object box based on the coordinates of the moving object;

comparing the moving object box of a current frame to moving object boxes of a previous frame with respect to a count zone, the count zone including a detection zone and a buffer zone; and incrementing an event counter when the moving object box of the current frame is in the buffer zone in the current frame and was in the detection zone in an earlier frame.

3. The method of claim 2 further comprising:

updating a current position of the object when the moving object box of the current frame overlaps in the detection zone with a moving object box of the previous frame.

4. The method of 2 further comprising:

adding the object to a database of tracked objects when the moving object box does not overlap in the count zone with any of the moving object boxes of the previous frame.

5. The method of claim 4 wherein the moving object box overlaps a buffer zone adjacent the detection zone.

6. The method of claim 2 wherein the event counter is incremented based on a direction of travel of the object through the count zone.

7. The method of claim 6 wherein the event counter is incremented when the object has moved out of the detection zone and into an exit buffer zone adjacent the detection zone, the exit buffer zone being on an opposite side of the detection zone from an entry buffer zone by which the object entered the count zone.

8. The method of claim 2 further comprising:

acquiring a video image upon which the current video frame is based at a frame rate determined in relation to known object movement parameters.

9. The method of claim 2 further comprising:

reducing the resolution of a video image to produce the current video frame by scaling the original video image.

10. The method of claim 9 wherein scaling comprises taking an average value of N×N size blocks, where N is selected to create a correctly sized scaled video image.

11. The method of claim 2 further comprising, prior to the step of subtracting, discarding the moving object box if it does not meet an object of interest threshold.

12. The method of claim 2 further comprising enhancing accuracy of the moving object boxes by:

identifying edge pixels in the moving object box; and updating the moving object box coordinates based of edge content of the box.

13. The method of claim 12 further comprising using minimum and maximum person size thresholds to analyze the moving object box to determine how many persons are contained in the moving object box.

14. The method of claim 13 wherein the minimum and maximum person size thresholds are determined by:

creating histograms of the smallest and largest moving object boxes in both the x and y direction for each event; and using the histogram peaks to calculate the minimum and maximum person sizes, which will by used to find people in moving object boxes by the people discriminator.

15. The method of claim 1 wherein threshold subtracting is based on a luma component of the current video frame.

16. The method of claim 15 further comprising:

determining the area of motion by threshold subtracting the luma component of the current frame from the short term average video scene.

17. The method of claim 16 wherein the area of motion comprises a bitmap of changed motion areas of the current frame.

18. The method of claim 16 wherein the short term average video scene is determined by filtering previous video frames using a short term average filter.

19. The method of claim 15 further comprising:

determining the object box by threshold subtracting the luma component of the current frame from the long term average video scene.

20. The method of claim 19 wherein the object box comprises a bitmap of changed object areas of the current frame.

21. The method of claim 19 wherein the long term average video scene is determined by filtering previous video frames using a long term average filter.

22. The method of claim 21 where the long term average filter is a non-linear filter, which is only updated for pixels of non-motion.

23. The method of claim 1 further comprising creating a new box under construction when the line segment is not adjacent to any boxes currently under construction.

24. The method of claim 1 further comprising defining a box under construction as a completed box when the box under construction does not have an adjacent line segment.

25. A computer-implemented method of counting a moving object, which, when executed by a processor, causes the processor to perform steps comprising:
- determining object box coordinates on each line of a video frame by:
  - generating a line segment based on a starting location and run-length of changed pixels of a current raster line of an object bitmap;
  - including the line segment in a box under construction when the line segment is adjacent to the box under construction; and
  - defining the box under construction as a moving object box when the box under construction intersects with a motion bitmap;
- comparing the moving object box of a current frame to moving object boxes of a previous frame with respect to a count zone, the count zone including a detection zone and a buffer zone; and
- incrementing an event counter when the moving object box of the current frame is in the buffer zone in the current frame and was in the detection zone in an earlier frame.

* * * * *

UNITED STATES PATENT AND TRADEMARK OFFICE
CERTIFICATE OF CORRECTION

PATENT NO. : 7,602,944 B2
APPLICATION NO. : 11/398538
DATED : October 13, 2009
INVENTOR(S) : Campbell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 860 days.

Signed and Sealed this

Fifth Day of October, 2010

David J. Kappos
*Director of the United States Patent and Trademark Office*